April 18, 1967   J. G. TAYLOR   3,314,455
BAND SAW RESAWING MACHINE

Filed July 24, 1964   6 Sheets-Sheet 1

INVENTOR.
JAMES G. TAYLOR
BY
Marechal, Biebel, French & Bugg
ATTORNEYS

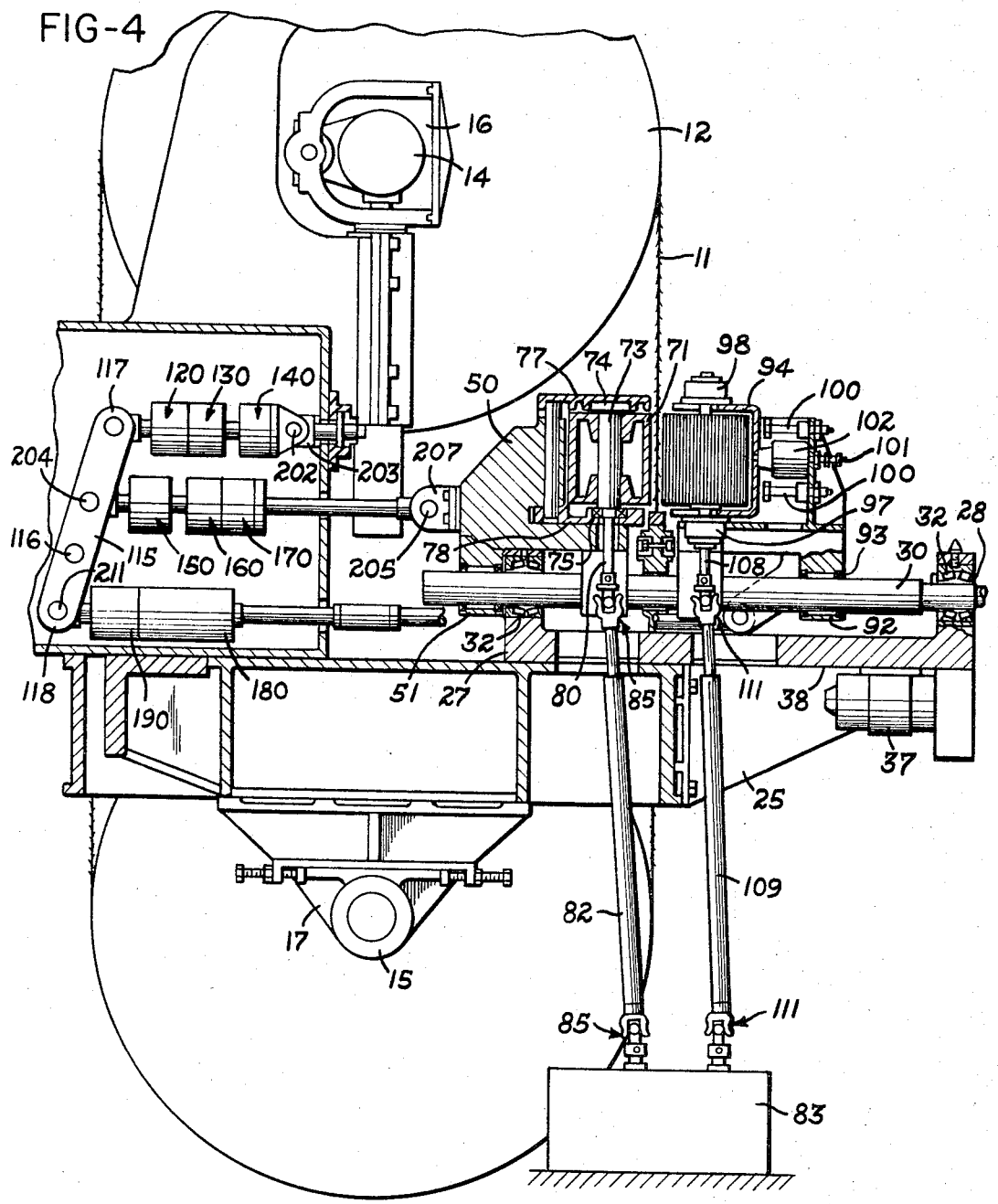

April 18, 1967 J. G. TAYLOR 3,314,455
BAND SAW RESAWING MACHINE
Filed July 24, 1964 6 Sheets-Sheet 3
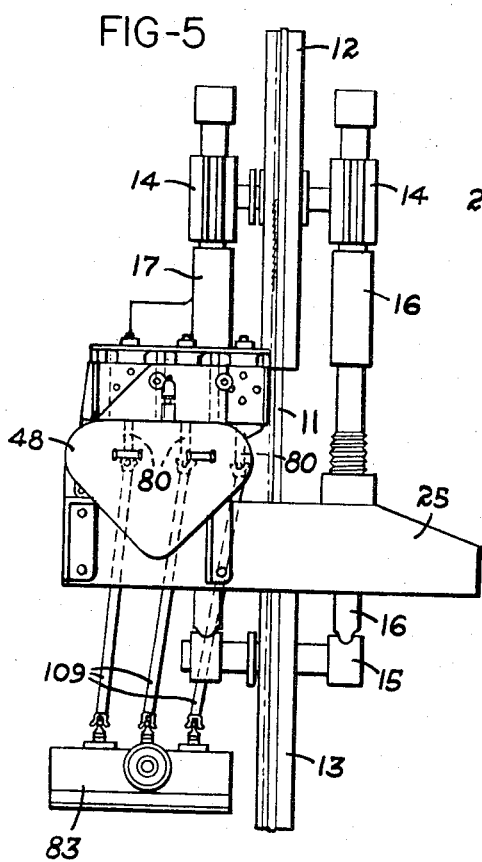
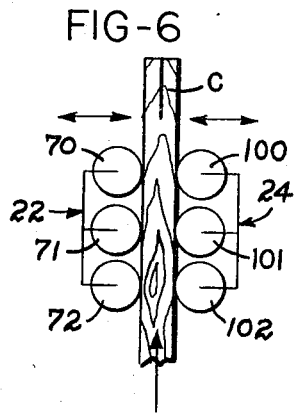
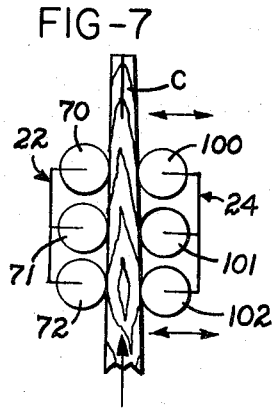
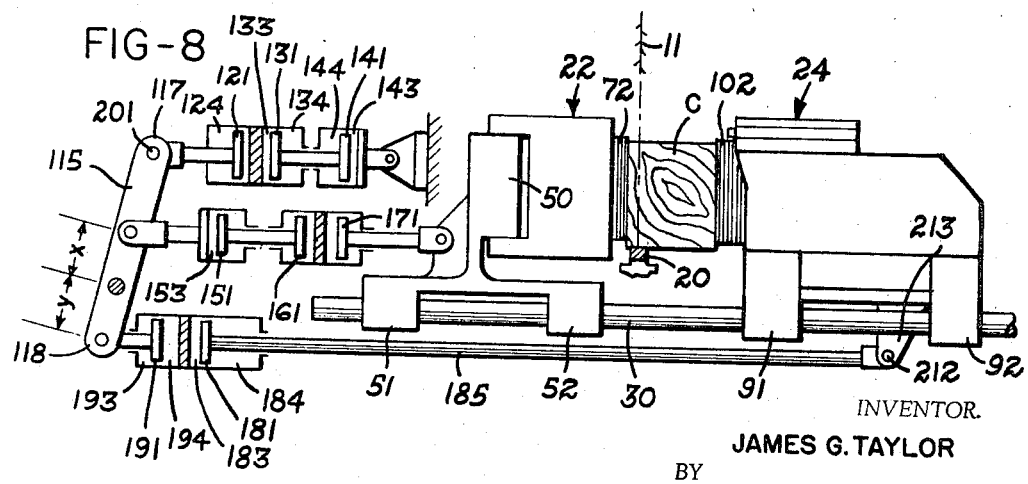
INVENTOR.
JAMES G. TAYLOR
BY
Marechal, Biebel, French & Bugg
ATTORNEYS

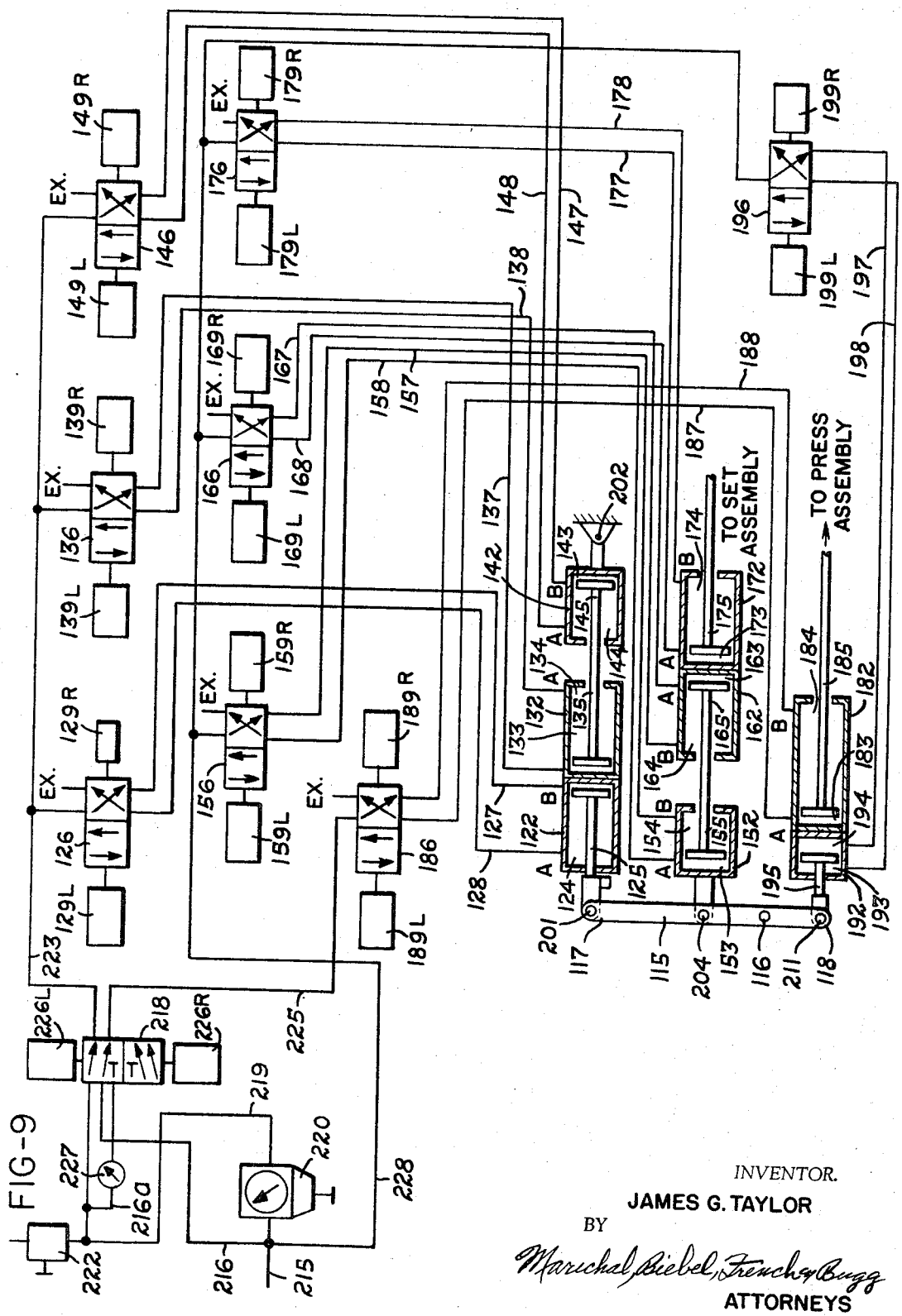

April 18, 1967     J. G. TAYLOR     3,314,455
BAND SAW RESAWING MACHINE
Filed July 24, 1964     6 Sheets-Sheet 5
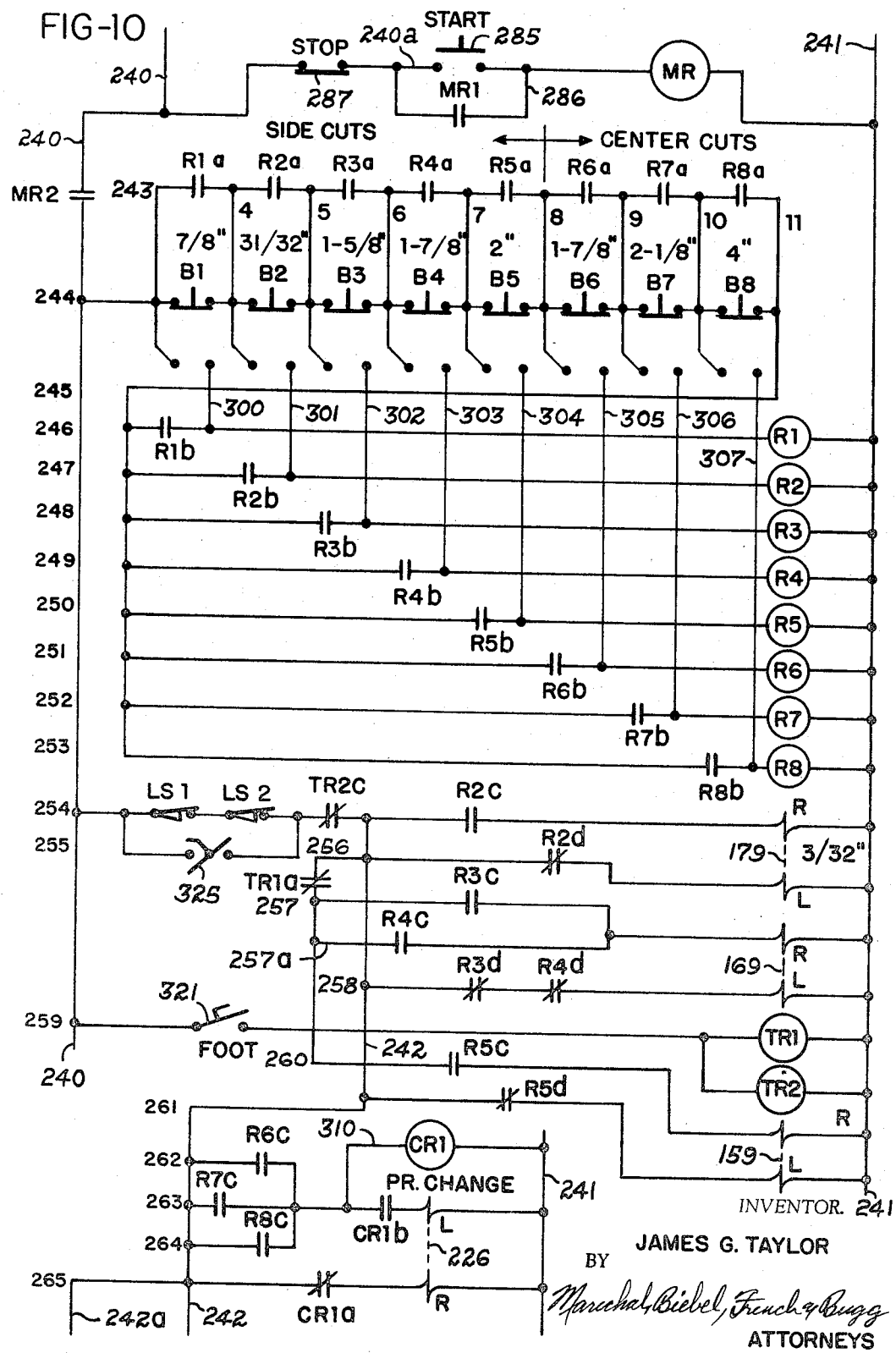
INVENTOR.
JAMES G. TAYLOR
BY
Marechal, Biebel, French & Bugg
ATTORNEYS

| ACT. | STROKE | | SIDE CUTS | | | | | CENTER CUTS | | |
|---|---|---|---|---|---|---|---|---|---|---|
| | | | 7/8" | 31/32" | 1-5/8" | 1-7/8" | 2" | 1-7/8" | 2-1/8" | 4" |
| 120 | 9-3/4" | 123 | A | A | A | A | A | A | A | A |
| | | 124 | H | H | H | H | H | L | L | L |
| 130 | 2-5/8" | 133 | A | A | A | A | A | A | A | L |
| | | 134 | H | H | H | H | H | L | L | A |
| 140 | 3/4" | 143 | H | H | A | H | H | A | L | L |
| | | 144 | A | A | H | A | H | L | A | A |
| 150 | 1-1/8" | 153 | H | H | H | H | A | A | A | A |
| | | 154 | A | A | A | A | H | H | H | H |
| 160 | 1" | 163 | H | H | A | A | H | A | A | A |
| | | 164 | A | A | H | H | A | H | H | H |
| 170 | 3/32" | 173 | H | A | H | H | H | H | H | H |
| | | 174 | A | H | A | A | A | A | A | A |
| 180 | 7-1/8" | 183 | A | A | A | A | A | A | A | A |
| | | 184 | L | L | L | L | L | H | H | H |
| 190 | 7/8" | 193 | A | A | A | A | A | L | L | L |
| | | 194 | H | H | H | H | H | A | A | A |

United States Patent Office 3,314,455
Patented Apr. 18, 1967

3,314,455
BAND SAW RESAWING MACHINE
James G. Taylor, Seattle, Wash., assignor to The Black Clawson Company, Hamilton, Ohio, a corporation of Ohio
Filed July 24, 1964, Ser. No. 384,993
16 Claims. (Cl. 143—5)

This invention relates to apparatus for sawing logs, or timbers, or other materials, and more particularly to a resaw setworks for center and side cutting.

The first operation in reducing a log to wooden planks or boards is to saw a portion of the log away to form a slab having one flat side thereon. Subsequently the remaining three rounded sides are cut away to form a so-called "cant" which is a rough timber having a rectangular or square cross-section, and this cant is then sawed into planks or center cut by use of a resaw of the type to which the present invention is directed.

A resaw is standard equipment in the average sawmill and generally includes a bandsaw of substantial size having in conjunction therewith a setworks for precisely positioning the cant with respect to the saw blade, as well as for feeding this cant toward the saw to cut the timber as desired. The setworks generally comprises two groups of power driven rolls including one group inside the plane of the saw, the rolls of which are called the "set rolls" and are capable of precise lateral adjustment so that the distance between the plane of the saw and the outer periphery of the set rolls may be varied to cut a board of given thickness.

The rolls of the other group are termed the "press rolls" and are disposed opposite the set rolls on the other side of the plane of the saw for cooperation with the set rolls in feeding the cant toward the saw blade. When the setworks is arranged for side cutting, the press rolls exert lateral or clamping pressure against the cant to position it firmly against the rigidly positioned set rolls so that a plank of uniform thickness can be sawed, even though the cant may have an uneven thickness. In addition, the press and set rolls are mounted directly opposite each other, and each of these rolls is driven at the same speed for forcing the cant through the setworks and to the saw blade.

The set and press rolls can also be utilized for center cutting wherein the cant or slab is sawed precisely down the center thereof, in which case the set and press rolls must move together so that they impart equal pressures on the cant or slab to insure that movement of one effects equal movement of the other in order that the saw is always disposed in alignment with the plane of the saw blade.

The resaws presently known in the art require substantial manual effort in order to convert from center to side cutting, or vice versa, and often these operations are made through a trial and error procedure requiring the operator to make a number of cuts before the desired center cut or side cut is achieved. Attempts have been made to automate this process, but they have resulted in systems which are quite complex and expensive, and which are still not completely automatic, in that one or more manual adjustments must be made during the course of converting the setworks from center cutting to side cutting or vice versa.

Accordingly, it is an important object of this invention to provide a simplified and highly reliable automatic control system for a resaw setworks, and particularly to provide such a setworks which can be instantaneously converted from side cutting to center cutting or from center cutting to side cutting without the usual manual modification thereof.

Another object of this invention is to provide an improved actuating mechanism for a resaw setworks which is capable of shifting the set and press roll assemblies rapidly to any of a plurality of settings for achieving the desired side cutting widths, and further to provide a control to program these assemblies for side or center cutting by use of a simplified mechanism which does not require connection or disconnection at any time from either of the set or press roll assemblies.

A further object of the invention is to provide a resaw setworks with automatic control for quickly moving the set and press rolls apart a substantial distance for inserting the cant or slab therebetween with ease, and particularly to provide such an automatic control which will also immediately return the set and press rolls to the previously programmed side or center cutting operation.

A further object of the invention is to provide a resaw setworks comprising a combination of simple mechanical linkages which can be expanded and are controlled through fluid and electrical control systems to effect the desired side or center cutting operation in response to a push button, and further to provide such a control system which is simple in design and operation and therefore comparatively dependable and maintenance free.

Other objects and advantages of the invention will be apparent from the following description, the accompanying drawings and the appended claims.

In the drawings:

FIG. 4 is a side view similar to FIG. 2 showing the invention in more detail;

FIG. 5 is a side elevation view of the setworks looking from right to left in FIG. 2;

FIG. 6 is a schematic plan view showing the setworks making a center cut;

FIG. 7 is a view similar to FIG. 6 showing the setworks making a side cut;

FIG. 8 is a schematic illustration of the actuating mechanism for the set and press roll assemblies;

FIG. 9 is a schematic illustration of the pneumatic control circuitry of the invention;

FIGS. 10 and 11 are schematic illustrations of the electrical control system of the invention.

Figure 1:
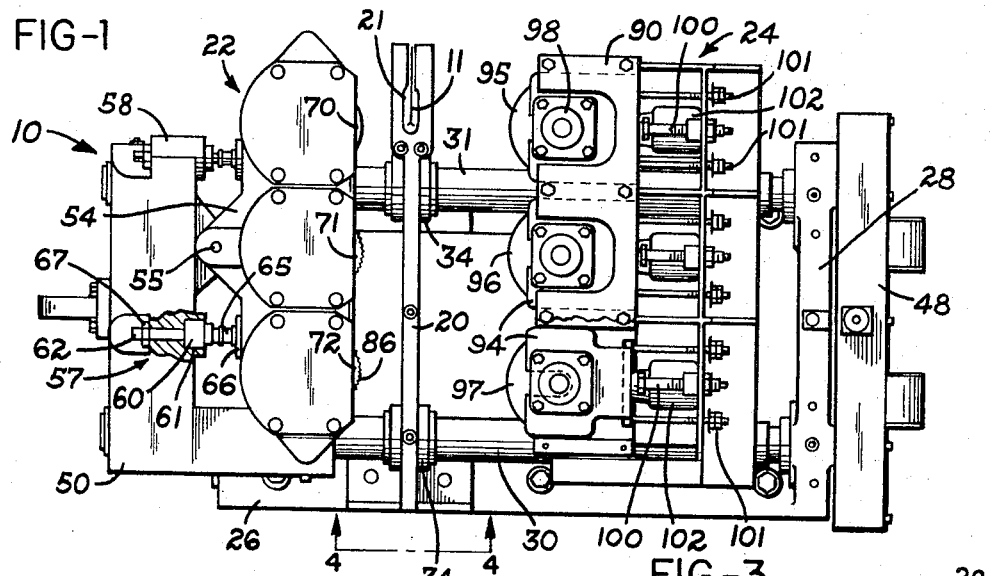
FIG. 1 is a plan view of the resaw setworks in accordance with the invention.
Figures 2, 3:
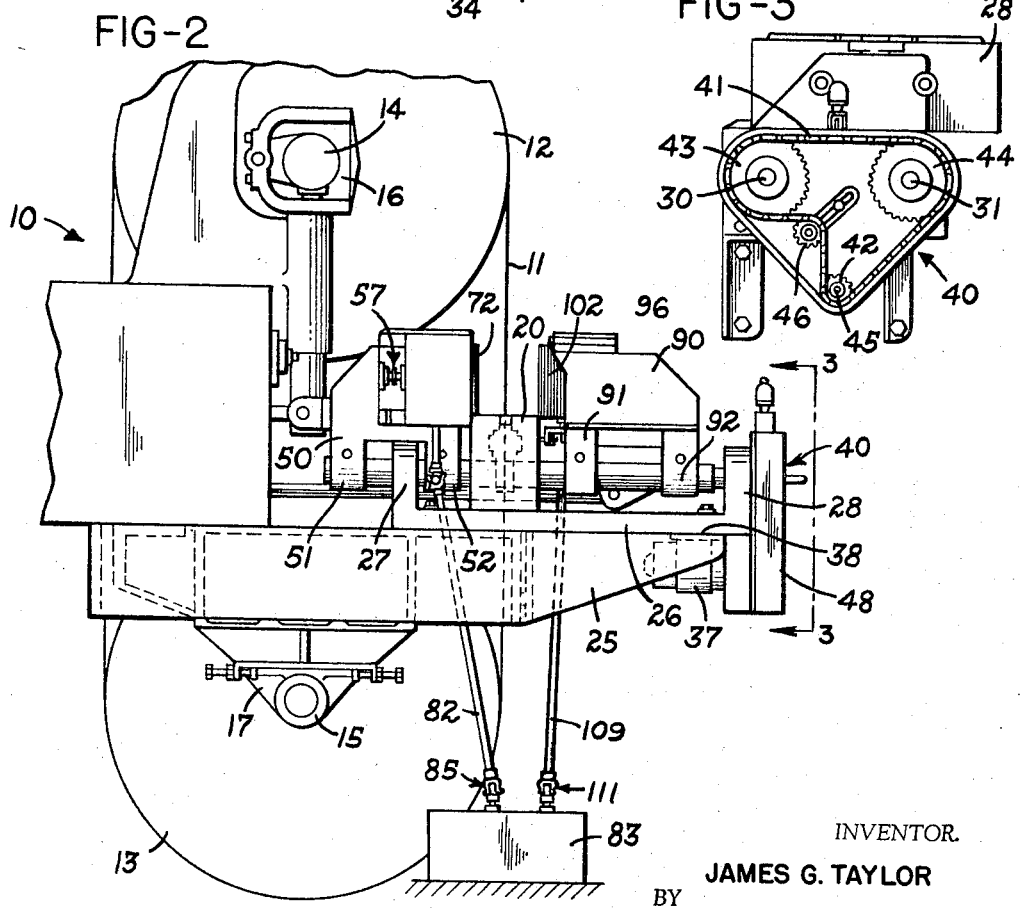
FIG. 2 is a front elevation view of the resaw setworks.
FIG. 3 is a side elevation view taken along the view line 3—3 of FIG. 2.

Referring to the drawings wherein a preferred embodiment of the invention is shown, FIGS. 1 and 2 show a resaw setworks 10 which includes a conventional endless bandsaw blade 11 mounted for movement on the upper and lower guide wheels 12 and 13 suitably secured for rotation in the bearings 14 and 15 on frame members 16 and 17 (see FIG. 5). The elongated feed table 20 is mounted in alignment with the saw blade 11 which moves through the slit 21 formed in one end thereof.

The set and press roll assemblies 22 and 24 (FIGS. 1 and 2) are mounted on opposite sides of the support table 20 and are moved automatically with respect to the midpoint of this table, which coincides with the cutting plane of the saw blade 11 so that the setworks can position a cant for either center or side cutting, as desired. More specifically, the setworks frame 25 has secured thereto a support member 26 having the upwardly extending flanges 27 and 28 at each end thereof for mounting the elongated support shafts 30 and 31. A pair of anti-friction bearings 32 (FIG. 4) are mounted in each of the flanges 27 and 28 to support the shafts 30 and 31 for frictionless rotation, and both these shafts are further supported by the bearings 34 mounted in the table 20, as seen best in FIG. 1.

The shafts 30 and 31 are simultaneously rotated to facilitate frictionless movement of the assemblies 22 and 24 by the motor 37 mounted on the lower surface 38 of the support member 26, as seen in FIG. 2. The motor 37 drives the shafts 30 and 31 through enclosed transmission unit 40 also mounted on the member 26, and this unit includes a chain 41 which interconnects the chain sprockets 42, 43 and 44 (FIG. 3) on the motor drive shaft 45 and the shafts 30 and 31, respectively. The adjustable idler pulley 46 is provided for adjusting the tension on the chain 41 as required. This entire transmission unit 40 is enclosed within a suitable housing 48 so that the unit is protected from dust and dirt from the surrounding atmosphere, and also so that the personnel operating the resaw will not be injured thereby.

The set roll assembly 22 includes an assembly support 50 (FIGS. 1 and 3) having the feet 51 and 52 thereon for receiving the shafts 30 and 31, respectively, on either side of the flange 27, as seen in FIG. 2, for movement of the assembly 22 on the shafts 30 and 31 toward and away from the table 20. The assembly further includes a roll support bracket 54 which is secured to the support 50 by the pin 55 for pivotal movement about the axis of this pin parallel to the plane of the saw blade 11. The bracket 54 is locked in position against pivotal movement by the adjustable screw assemblies 57 and 58 positioned in the support 50 on either side of the pin 55.

Each of the screw assemblies 57 and 58 includes an internally threaded nut member 60 which is secured in the recess 61 in the support 50, and a screw 62 which is threadedly received therein. Each of the screws 62 is rotated by use of a wrench on the left end thereof, as seen in FIG. 1, and the other end thereof has a head 65 which engages the metal plates 66 on the roll support bracket 54. The lock nuts 67 are provided on the left end on each of the screws for locking them in place. This arrangement permits adjustment of the roll support bracket 54 with respect to the axis of the pin 55 and the plane of the saw blade 11.

Each of the set rolls 70, 71 and 72 is rotatably mounted on the roll support bracket 54 by a shaft 73 so that the axes thereof are parallel to each other and to the plane of the saw. As seen in FIG. 4, each of the shafts 73 is rotatably supported in the bearings 74 and 75 mounted in the upper and lower plates 77 and 78, respectively, on the bracket 54. The rolls 70, 71 and 72 are individually driven through the shaft extensions 80, which are formed on the lower ends of the respective support shafts 73, and the elongated drive shafts 82 which interconnect the shafts 73 with the conventional drive mechanism 83, shown schematically in FIGS. 2 and 4. A universal joint 85 is provided at each end of each of the drive shafts 82 so that the set roll assembly 22 can be moved back and forth on the support shafts 30 and 31 while the set rolls 70, 71 and 72 are being driven. The first two of the set rolls have axially extending teeth 86 on the outer surfaces thereof for gripping a cant to insure that rotation of the rolls 70, 71 and 72 will effect feeding of a cant toward the saw blade 11.

The press roll assembly 24 is not pivotally mounted but is otherwise similar to the set roll assembly 22 and includes an assembly support 90 (FIG. 1) having downwardly extending feet 91 and 92 with bearings therein for receiving the shafts 30 and 31 providing for movement of the assembly 24 thereon back and forth with respect to the plane of the saw blade 11.

The U-shaped roll support brackets 94 are mounted on the support 90, as shown in FIGS. 1 and 4, for supporting the press rolls 95, 96 and 97. Each of the rolls has an upper and lower bearing 98 and 99 secured to the U-shaped bracket 94 for frictionless rotation of the press rolls with respect to the brackets 94 and the support 90. Each of roll brackets 94 are mounted for limited movement with respect to the support 90 so that cants with rough surfaces thereon can be handled easily by the press roll assembly. Thus the roll brackets move to the right, as shown in FIG. 1 until they engage the adjustable screw stops 100, and to the left until the adjustable screw stop 101 limits this motion.

In addition, the air springs 102 which are connected to a suitable source of air pressure continually urge the bracket 94 and their associated press rolls to the left, and these air springs are compressed when a cant forces the associated press roll to the right thereby accommodating rough and uneven cants or slabs. The press rolls 95–97 are similarly connected to and driven by the drive mechanism 83 through the shaft extension 108 and drive shafts 109, which have universal joints 111 at each of the ends thereof for permitting the press rolls to be rotated even when the press roll assembly 24 is moving toward and away from the support table 20.

The actuating mechanism for the set and press roll assemblies 22 and 24 is an important feature of the invention and includes an actuating lever 115 mounted on the frame 25 for pivotal movement on the support pin 116, as shown in FIGS. 4 and 7. This mechanism basically includes the three centering actuators 120, 130 and 140, which interconnect the upper end 117 of the actuator lever 115 and the frame 25 of the setworks, and the three set actuators 150, 160 and 170, which are secured between the lever 115 and the set assembly 22. In addition, the lower end 118 of the lever 115 is secured to the press roll assembly 24 by the press actuators 180 and 190. As will be seen, the centering, set and press actuators form expandable linkages which are capable of positioning and controlling the operation of the set and press assemblies 22 and 24.

Each of the centering, set and pressure actuators is basically the same except for the length of its stroke, and to eliminate a protracted explanation of each, the last digits of the reference characters 121 through 199 are used to indicate corresponding components of these actuators. Thus the last digit "1," as in 131, 141, etc., indicates the piston of each of these actuators, and this piston divides the associated cylinder 2 into piston and rod chambers 3 and 4, and a piston rod 5 extends through one end of each cylinder 2. Thus to illustrate this numbering system, the piston and cylinder of set actuator 170 are indicated by the reference characters 171 and 172, and the cylinder 172 has chambers 173 and 174. Each of these actuators also has a four-way valve 6 (FIG. 9) which controls the fluid flow through the line 7 to the piston chamber 3 and through the line 8 to the rod chamber 4, and the valve 6 is shifted by the right and left solenoids 9R and 9L.

Referring to FIG. 9, it is seen that the piston rod 125 of the actuator 120 is connected to the upper end 117 of the actuator lever 115 by a pin 201, and the cylinders 122 and 132 of the actuators 120 and 130 are rigidly interconnected so that these actuators move together. In addition, the piston rods 135 and 145 of the actuators 130 and 140 are rigidly interconnected, and the cylinder 142 of the actuator 140 is connected to the frame 25 by a pin 202 which engages a suitable bracket 203 on the frame. Thus these centering actuators 120, 130 and 140 are interconnected and cooperate to form an expandable linkage capable of rotating the lever 115 about its pivot axis.

The set actuators 150, 160 and 170 are very similar to the centering actuators, and the cylinder 152 of the actuator 150 is connected to the lever 115 intermediate the pins 116 and 201 by a pin 204, whereas the piston rods 155 and 165 of the actuators 150 and 160 are rigidly interconnected so that these actuators act together. The cylinders 162 and 172 of the actuators 160 and 170 are also rigidly interconnected as shown in FIG. 8, and the piston rod 175 of the actuator 170 is connected to the set assembly support 50 by a pin 205 which engages a suitable bracket 207 on the assembly support 50. Thus the three set actuators are interconnected and cooperate to provide an expandable linkage between the lever 115 and the set assembly 22 for effecting relative movement therebetween.

The press actuators 180 and 190 have their cylinders 182 and 193 secured together, and have the piston rod 195 connected to the lower end 118 of the actuator lever 115 by the pivot pin 211, and the piston rod 185 of the actuator 180 is connected to the press roll assembly 24 by the pin 212 which interconnects the downwardly extending bracket 213 on the assembly support 70 and the right-hand end of the piston rod 185. Here again, an expandable linkage is provided between the lever 115 and the press assembly 24.

Referring now to the schematic illustration of FIG. 9, high pressure air is supplied to this system through the line 215, which has a branch 216 communicating directly with the four-way pressure change valve 218 and a low pressure branch 219 having therein a pressure regulator 220 and relief valve 222 for substantially reducing the high pressure. The low pressure branch 219 is also connected to the pressure change valve 218 so that high and low pressure air is supplied to either of the pressure lines 223 and 225 by appropriate actuation of the solenoids 226R and 226L which position the valve 218. The branch 216a of line 216 has a further pressure regulator 227 therein for reducing the pressure in the press roll cylinders during side cutting, as will be seen.

A high pressure line 228 is also connected to the line 215 and bypasses the valve 218 for supplying the high pressure air to each of the set actuator valves 156, 166, 176 and 196, whereas the line 223 is connected to the valves 126, 136 and 146 for the centering actuators 120, 130 and 140, and the line 225 is connected to the valve 186 which controls the press actuator 180. Thus by shifting the pressure change valve 218, either high or low pressure air can be supplied to the centering and press valves 126, 136, 146 and 186 for controlling the centering and press actuators, whereas the high pressure is always communicated through the line 228 to the valves 156, 166 and 176 which control the set actuators.

Sequence of automatic operation

The operation of the setworks is best described in connection with the detailed explanation of the electrical and pneumatic diagrams shown in FIGS. 9-11 and the chart shown in FIG. 12. The electrical system can be viewed in its entirety by placing FIG. 10 immediately above FIG. 11 so that the electrical conductors 241 and 242 are in alignment. For convenience in explanation, each electrical conductor is designated by a single line number with the horizontal conductors being numbered consecutively along the left-hand edge of FIGS. 10 and 11. Each of the relays used in the electrical system comprises a coil which is given the relay number and one or more normally closed or normally open contacts designated by the same reference characters as the associated coil with a small letter suffixed thereto. For example, the relay R3 has the normally open contacts R3a, R3b, R3c, R3e and the normally closed contacts R3d, R3f and R3g operated thereby.

Also for convenience in explaining the operation of the setworks, certain dimensions and sizes are used, and it is stressed that such dimensions and sizes are for purposes of illustration, and are in no way intended to be a limitation on the scope of the invention. For example, each of the eight actuators has a stroke as indicated in FIG. 14, although this stroke could vary substantially within the scope of the invention.

When it is desired to make a side or center cut, it is first necessary to energize the electrical system by depressing the start switch 285 in the line 240A thereby energizing the relay MR by completion of a circuit between the power lines 240 and 241. Energizing of relay MR closes the normally open switch MR1 in the line 286 so that when the push button switch 285 is released, the relay MR will remain energized. A stop switch 287 is also provided in the line 240a so that the relay MR can be easily deenergized by actuation of this switch when it is desired to shut down the system.

The relay MR also closes the normally open switch MR2 in the line 240 immediately above the connection to line 244 so that power is connected to the line 244 only when the relay MR is energized. When the switch MR2 is closed, the remaining portion of the electrical system is energized and ready to effect appropriate operation of the setworks in response to the push button switches B1–B8 to accomplish the desired side or center cut.

When initially energized, the electrical system positions each of the eight control valves for the centering, set and press actuators, as well as the pressure change valve 218, in position for making the smallest side cut. In detail, a circuit is initially completed to the solenoid 226R through the lines 240 and 265 having the normally closed switch CR1a therein, which causes the pressure change valve 218 to be moved upwardly, as viewed in FIG. 9 to connect the high pressure line 216 with the line 223, and the low pressure line 219 with the line 225.

Simultaneously, the solenoid 129L of the valve 126 (FIG. 9) is energized by completion of a circuit through the lines 242a, 272 and 271, and this action shifts the valve 126 to the right to connect the high pressure line 223 to the line 128, and the line 127 to the atmosphere thus retracting the actuator 120. The solenoid 139L of the valve 136 s siimilarly energized by completion of a circuit thereto through the line 274 having the normally closed relay switch R8e therein so that high pressure air is communicated to the chamber 134 of the cylinder 132 through the line 138, and the chamber 133 is vented through line 137 thus retracting the actuator 130.

At the same time, the valve 146 is positioned as shown in FIG. 9 by energization of the solenoid 149R in line 276 having the normally closed contacts R3g and R6d so that high pressure air in line 223 is communicated to the piston chamber 143 of the actuator 140 through line 147, and the piston chamber 144 is vented through line 148. Thus in the initial or start position, the actuators 120 and 130 are retracted and the actuator 140 is extended.

The set actuators 150, 160 and 170 are each extended by operation of their associated valves, with the valve 156 being moved to the right by energization of the solenoid 159L in the line 261 having the normally closed switch R5d therein, so that high pressure air from line 228 is communicated to the piston chamber 152 of the actuator 150 through the line 158, while the chamber 154 is vented through line 157. This action causes the piston rod 155 to be extended from the cylinder 152.

The valve 166 is similarly moved to extend the piston rod 165 by energization of the solenoid 169L in the line 258 which has the normally closed switches R3d and R4d therein causing the valve 166 to be moved to the right, as shown in FIG. 9, to connect the high pressure line 228 to the line 168 and chamber 163, and to vent the rod chamber 164 through line 167. The high pressure line 228 is also connected to the piston chamber 173 through line 177 of the actuator 170 by energization of the solenoid 179L in line 256 which has the normally closed relay R2d therein. The rod chamber 174 thereof is simultaneously vented through line 178 thereby effecting the extension of the actuator 170. The line 254 which connects line 240 and 242 has the normally closed limit switches LS1 and LS2 therein of which one or both are opened when a cant is in the resaw.

Also upon initial energization of the relay MR, the rod chamber 184 of the press actuator 180 has low pressure air supplied thereto through line 188 in response to the energization of the solenoid 189R by completion of a circuit through line 269. The piston chamber 183 is vented through line 187 so that the piston 181 and rod 184 urge the press assembly 24 to the left, as seen in FIG. 8. In summary, before any of the switches B1–B8 are closed, each of the centering, set and press actuators 120–180 is positioned in a normal position, as indicated above.

Also in this start position of the setworks, both the control relays CR2 and CR3 in lines 277 and 278, respectively, are energized since each of the switches therein are normally closed. This action opens the normally closed switches or contacts CR2a and CR3a in lines 279 and 280 so that the solenoids 199L and 199R are inactive. However, once the setworks is programmed for a particular side or center cut one of the normally closed contacts in lines 277 or 278 will be opened so that one of the relays CR2 or CR3 is deenergized to close its associated switches in lines 279 or 280 to thus energize one of the coils 199R or 199L.

When a cant is placed in the setworks between the assemblies 22 and 24 the press assembly 24 urges the cant against the set assembly 22. Since the centering and set actuators 120–170 are pressurized with the high pressure air, any force generated by the press actuator 180 is insufficient to override or effect movement of the set assembly 22, and therefore the assembly 22 is in effect locked in position with respect to the press assembly 24.

When it is desired to cut a plank ⅞ inch in thickness from a cant, the switch B1 in line 244 is momentarily depressed so that a circuit is completed through the lines 244 and 300 to energize the relay R1 in line 246. Energization of the relay R1 immediately closes the normally open switches R1a in line 243 and R1b in line 246 to maintain current flow to the relay R1 after the switch B1 is released. The contacts R1c in line 277 are opened so that the relay CR2 is deenergized thus closing the contacts CR2a in line 279 to energize solenoid 199L. This action shifts the valve 196 to the right and connects the high pressure in line 228 to the line 198 and chamber 193 to retract the actuator 190. The chamber 194 is connected to the atmosphere through the line 197 and valve 196. This advances the press rolls ⅞ inch toward the plane of the saw blade so that these press rolls are aligned with the saw blade and the setworks can side cut a cant which has a thickness between ⅞ and 1½ inches. No other action is effected at this time since the set actuators 150, 160 and 170 are extended and have positioned the set roll assembly 22 so that the distance between the outer periphery of the set rolls 70, 71 and 72 and the plane of the saw blade 11 is ⅞ inch.

The rod chamber 184 of the press actuator 180 is connected to the low pressure air as indicated above, so that as a cant C is fed between the set and press roll assemblies 22 and 24, the press assembly 24 moves inwardly and outwardly to accommodate the thickness of the cant (see FIG. 7) while urging the same with a predetermined amount of force toward the stationary set assembly 22 so that a ⅞ inch thick plank is cut from the cant C. The cant C is forced toward the saw blade 11 by rotation of the rolls 70, 71, 72, 95, 96 and 97 which are rotated at the same speed by the drive mechanism 83 and which are held in tight contact with the cant by the various actuators 120–190.

When it is desired to make a side cut of 31/32 inch, the push button switch B2 is momentarily depressed thus energizing the relay R2 by completion of a circuit through the lines 244, 301 and 247. The switch B2 also opens the line 244 so that current flow to relay R1 is terminated, and the relay R1, and any other relay which is energized save the relay MR, and its associated switches are returned to their normal or initial positions. The relay R2 immediately closes the normally open switches R2a and R2b in lines 243 and 247 so that the relay R2 remains actuated by a circuit through the line 243, 244, 245 and 301.

The relay R2 also closes the switch R2c in line 254 and opens the normally closed switch R2d in line 256 so that the solenoid 179L is deenergized and the solenoid 179R energized to shift the valve 176 to the left to connect the high pressure air in line 228 to the rod chamber 174 of actuator 170 causing the rod 175 and the set roll assembly 22 to move to the left 3/32 inch from the plane of the saw blade 11. The other actuators are not in any way affected and operate as explained above, and the set assembly 22 is now effectively locked 31/32 inch (normal position is ⅞ inch) from the plane of the saw blade. The contacts R2e in line 277 now open the circuit to the relay CR2 to maintain energization of solenoid 199L in line 279.

When it is desired to make a 1⅝ inch side cut, the switch B3 in line 244 is momentarily depressed causing current to flow from the line 244 through the lines 302 and 248 to energize the relay R3 which immediately closes the normally open switches R3a and R3b to maintain a circuit to relay R3 when the switch B3 is released. The relay R2 is deenergized with the energization of relay R3 since the circuit through line 244 to the line 301 is momentarily broken when the switch B3 is depressed, and as a result, the actuator 170 and associated controls return to their normal positions. Energization of the relay R3 closes the normally open switch R3c in line 257 and opens the normally closed relay R3d in line 258 so that the solenoid 169L is deenergized and the solenoid 169R is energized to shift the valve 166 to the left to vent the piston chamber 163 and connect the rod chamber 164 to the high pressure air lines 228. This withdraws the set roll assembly one inch so that the effect of actuator 160 is to move the set roll assembly to a position 1⅞ inches from the plane of the saw.

Simultaneously, relay switch R3e in line 275 is also closed and switch R3f in line 276 is opened so that the solenoid 149L for the valve 146 is also shifted to communicate high pressure air in lines 223 to the rod chamber 144 and to vent the piston chamber 143. This effects movement of the upper end 117 of the lever 115 through ¾ inch to the right thereby moving the set roll assembly 22 toward the plane of the saw blade 11 a distance equal to ¼ inch so that the total effect is to position the assembly 24 for a side cut 1⅝ inch in thickness. Again the sawing operation is the same as described above, except that a plank of larger thickness is cut. At this setting the contacts R3g in line 277 are open to maintain deenergization of relay CR2 so that solenoid 199L remains energized.

When it is desired to make a side cut 1⅞ inch in thickness, the switch B4 in line 244 is momentarily depressed to establish a circuit to the relay R4 through the lines 244, 303 and 249. As the switch B4 is depressed, it momentarily opens the line 244 so that current flow to relay R3 is terminated and this relay is deenergized. Energization of relay R4 closes the normally open switch R4a in the line 243 so that current flow through the line 244 is maintained during the time the switch B4 is returning to its open position. The switch R4b in line 249 is also closed so that current is maintained to the relay R4 through the line 243, 244, 303 and 249 when the switch B4 is released.

The relay R4 also closes the normally open switch R4c in line 257a and opens the normally closed switch R4d in line 258 so that the solenoid 169R remains energized and continues to position the valve 166 so that high pressure air from the line 228 is communicated to the rod chamber 164 and the piston chamber 163 is vented. Thus the actuator 166 positions the set assembly 22 to a position spaced 1⅞ inch from the plane of the saw cut. Due to the deenergization of relay R3 and the opening and closing of switch R3c and R3e, respectively, the actuator 140 has returned to its normal position wherein the rod chamber 144 is pressurized so that it does not influence the position of the set assembly 22 as it did during the 1⅝ inch side cut setting. Here again, the setworks is in position for a side cut in the manner described above, except that a plank 1⅞ inch will be cut.

When it is desired to make a 2-inch side cut, the switch B5 in lines 244 is momentarily depressed to effect deenergization of the relay R4 due to the opening momentarily of the line 244 and to effect energization of relay R5 through the lines 244, 304 and 250. The normally opened switches R5a and R5b in lines 243 and 250 are simultaneously closed by the relay R5 so that current is maintained to this relay once the switch B5 is released from its depressed position. The relay R5 also closes the normally open switch R5c in line 260 and opens the normally closed switch R5d in line 261 to energize the solenoid 159R for shifting the valve 156 to the left so that the high pressure air in line 228 is communicated to the rod chamber 154 and the piston chamber 153 is vented. This causes the actuator 150 to retract the set assembly 22 a distance equal to its stroke of 1⅛ inch or a total of 2 inches from the plane of the saw cut so that a side cut of increased thickness is made substantially as hereinbefore described. Thus the manually operated push button switches B1–B5 effect the desired thicknesses of side cuts, and it should be understood that additional thicknesses of side cuts could be achieved by adding additional actuators and their associated controls to achieve the desired thickness.

Figure 12:
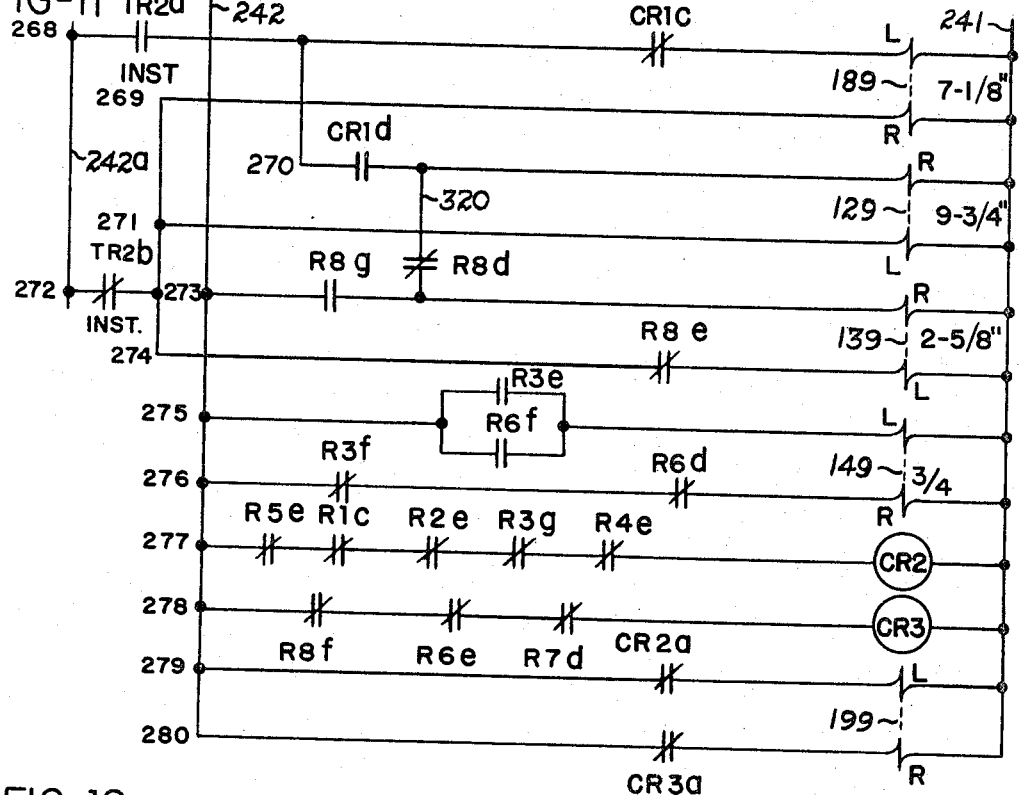
FIG. 12 is a tabular illustration of the pressurization of the various actuators during each setting of the control mechanism of the setworks.

The push button switches B6–B8 are used to program the setworks for center cutting of cants, and these switches are used to separate the assemblies 22 and 24 distances of 1⅞, 2⅛ and 4 inches, respectively, as indicated in FIG. 12. When it is desired to achieve a center cut wherein the assemblies 22 and 24 are spaced apart a total of 1⅞ inches, the switch B6 is momentarily depressed causing any of the relays R1–R8 which are energized to be deenergized due to opening of the circuit through the line 244. The relay R6 immediately closes the normally open switches R6a and R6b in lines 243 and 251 so that current is maintained to the relay R6 after the switch B6 is released, and the normally open switch R6c in line 262 is closed so that the control relay CR1 in line 310 is energized. This control relay closes the normally open switch CR1b in line 263 and opens the normally closed switch CR1a in line 265 to energize the solenoid 226 to shift the pressure change valve 218 so that the low pressure line 219 is connected to line 223 and the high pressure line 216 is connected to the line 225.

Energization of relay R6 also closes the normally open switch R6f in line 275 and opens the normally closed switch R6d in line 276 to energize the solenoid 149L and shift the valve 146 to the right so that the low pressure air in line 223 is connected to the rod chamber 144 through line 148 causing the lever 115 to be moved clockwise to move both assemblies 22 and 24 toward the plane of the saw.

The effect of changing the line 223 from high to low pressure is to change the centering actuators to control the movement of both assemblies 22 and 24 to insure that movement of one assembly in any direction will effect equal movement of the other in an opposite direction. In changing the line 223 from low to high pressure, the press actuator 180 no longer is permitted relative movement between the piston 181 and cylinder 182 so that the actuator 180 is, in effect, locked in its retracted position. Since the set actuators 150, 160 and 170 are also supplied with high pressure air, they also are locked in position with respect to the centering actuators 120, 130, and 140.

During the center cutting operations, one of the normally closed contacts R6e, R7d, or R8f in line 278 is always open so that the relay CR3 is deenergized and the contacts CR3a in line 280 are closed to energize the solenoid 199R and shift the valve 196 to the left as viewed in FIG. 9. This connects the pressure in line 228 to the line 197 to extend the actuator 190 and move the press assembly 24 to the right from the plane of the saw blade so that both assemblies 22 and 24 are spaced equal distances from the plane of the saw blade for center cutting.

As shown in FIG. 8, the distances $x$ and $y$ between the pivot pins 116 and 204, and 116 and 211, respectively, are equal so that rotation of the lever 115 effects movement of the assemblies 22 and 24 through equal distances. When the set and press assemblies 22 and 24 are used for center cutting, they are at all times spaced equal distances from the plane of the saw blade so that regardless of the thickness of the cant being cut, the center thereof is aligned with the saw blade 11. In addition, the centering actuators 120, 130 and 140 urge the lever 115 in a clockwise direction to hold each of the assemblies 22 and 24 firmly against the cant so that the rolls 70–72 and 100–102 feed the cant toward the saw blade 11. However, the low pressure air is connected to these centering actuators so that if the cant has an irregular outer thickness, they will move inwardly or outwardly to accommodate this thickness while maintaining the center of the cant in alignment with the blade 11. The actuators 150–190 have the high pressure air connected thereto so that they cannot be overridden as the centering actuators expand and retract.

Thus in response to the depression of switch B6, the assemblies 22 and 24 are moved together to their inwardmost positions wherein they are 1⅞ inches from each other and are centered on the support table 20 and the saw blade 11. Such a setting is made when a relatively thin cant is being center cut, and if a thicker cant is to be processed, a larger distance between the assemblies 22 and 24 would be used. When a larger distance is used, it reduces the time required to separate the assemblies during insertion of a cant.

Since the assemblies are urged toward a spacing of 1⅞ inches aligned with the saw blade when the cant C is off center, one of the assemblies will exert more pressure thereon than the other, and this pressure differential will urge the cant laterally until the pressures on opposite sides thereof are balanced, as only occurs when the cant C is centered in the setworks. For example, when the center of a cant is spaced to the right of the plane of the saw blade as viewed in FIG. 8, the press assembly 24 will be exerting pressure thereon but the set assembly 22 will not since the lever 115 causes them to be spaced equal distance from the plane of the saw. The center actuators 120, 130 and 140 urge the assemblies 22 and 24 to the center so that the press assembly 24 will move the cant to the left until each of the assemblies 22 and 24 engages the same with equal pressure, at which time the cant is centered.

If a distance of 2⅛ inches is desired between the assemblies 22 and 24 prior to the insertion of the cant, the switch B7 is depressed causing the relay R7 in line 252 to be energized by completion of a circuit through lines 244, 306 and 252. All others of the relays R1–R8 are deenergized when the line 244 is opened by the switch B7, and the relay R7 immediately closes the switch R7a in line 243 and R7b in line 252 to maintain its energization. The switch R7c in line 263 is also closed to maintain energization of relay CR1 and solenoid 226L, as described above. The only difference in operation when switch B7 is depressed as compared to that which occurs when switch B6 is depressed, is that in the former instance the solenoid 149L is not actuated so that the actuator 140 remains in its normally retracted position wherein the assemblies are spaced apart 2⅛ inches.

When it is desired to set the assemblies 22 and 24 four inches apart for center cutting, the switch B8 in line 244 is depressed to effect the energization of relay R8 by completion of a circuit thereto through lines 244, 307 and 253. This relay closes the R8a in line 243, R8b in line 253, and R8c in line 264 to maintain energization of the relays R8 and CR1, as well as the solenoid 226L. In addition, the switch R8g in line 273 is closed and switch R8e in line 274 is opened so that the solenoid 139R is actuated to shift the valve 136 and effect the extension of actuator 130 to rotate the lever 115 in a counterclockwise direction to space the assemblies apart 4 inches, as desired. The operation of the center cutting is otherwise the same as described above, except that switch R8d in line 320 is opened so that actuator 120 cannot be extended when 130 is extended.

The side and center cutting operations are thus controlled by the pneumatic and electrical systems which position the actuators 120–190 by the use of low and high pressure air. The position of each of these actuators is summarized in the chart shown in FIG. 12 wherein the letter H is used to indicate high pressure air, the letter L is used to indicate low pressure air and the letter A indicates that particular chamber of the associated actuator is vented to the atmosphere. Thus by viewing this chart under the appropriate side or center cut, the pressurization of each of the chambers of each of the actuators 120–190 can readily be determined. For example, when a side cut 1⅝ inches thick is being made, the rod chambers 124, 134, 144, 164, and 194 have high pressure air supplied thereto, whereas the piston chambers 153 and 173 have the high pressure air connected thereto. The rod chamber 184 has the low pressure air supply connected thereto, and each of the other rod and piston chambers is connected to the atmosphere.

The foot switch 321 in line 259 is provided to effect quick separation of the set or press assemblies so that a cant can be inserted into the setworks or for use in an emergency. During side cutting operations, only the press assembly 24 is retracted from the plane of the saw blade, and this occurs when the switch 321 in line 259 is depressed to complete a circuit to the time operated relays TR1 and TR2. The relay TR2 then instantly closes the contacts TR2a in line 268 and opens the normally closed contacts TR2b in line 272. Since the setworks is programmed for side cutting, the control relay CR1 is not energized and therefore the contacts CR1c and CR1d in lines 268 and 270, respectively, remain in their normal position. Consequently the solenoid 189L is energized to shift the valve 186 to the left and connect the pressure in line 225 to the piston chamber 183 to extend the actuator 180. The stroke of this actuator is 7⅛ inches so that the press assembly 24 is retracted a substantial distance from the plane of the saw cut. The contacts TR2b are open so that the relays 189R, 129L and 139L are deenergized.

The relay TR2 also operates the contacts TR2c in line 254 which are "timed to open" so that the circuit to the remainder of the valve actuating solenoids is maintained for a set period of time after initial energization of the relay TR2. This allows the functions described above to be initially carried out and then maintained until the foot switch 321 is released. The contacts TR1a between lines 256 and 257 are "timed to close" so that they are open immediately upon deenergization of TR1 and then close after a set period of time. The purpose of this delay is to prevent retraction of the actuators 150 and 160 until the other actuators have time to move. Otherwise the combination of actuator movements could cause the set roll assembly 22 to hit on one end of the setworks.

When the foot switch 321 is closed during center cutting operations, the contacts CR1c in line 268 are opened and the contacts CR1d in line 270 closed and the solenoid 129R is energized to cause extension of the actuator 120 to move both the set and press roll assemblies 22 and 24 equal distances from the plane of the saw blade. When the 1⅞ inch or 2⅛ inch center cuts are being made the solenoid 139R will also be energized to extend the actuator 130 and thus move both the assemblies 22 and 24 an additional distance from the plane of the saw blade. Since the solenoid 139R will be energized during the 4 inch center cut and the contacts R8g in line 273 will be closed, the contacts R8d in line 320 are open for proper operation of the system.

The limit switches LS1 and LS2 in line 254 are opened when a cant is in the setworks so that the assemblies 22 and 24 cannot be moved since these switches control the flow of electrical current to the solenoids 129–199. When the current is cut off from these solenoids the associated valves 126–196 remain in position and continue to operate. An emergency bypass switch 325 is provided in parallel with the limit switches LS1 and LS2 for bypassing them for maintenance and repair purposes.

FIGS. 4–7 illustrate schematically the operation of the set and press assemblies 22 and 24. Specifically, FIG. 6 illustrates a center cutting operation wherein both of the assemblies 22 and 24 move equal distances in opposite directions to insure that the cant C is cut in the center thereof. A side cutting operation is illustrated in FIG. 7 wherein the set assembly 22 is locked in position and the press assembly 24 floats to accommodate the right-hand side of the cant while urging the entire cant against the set assembly 22.

While three centering and three set actuators are shown and described in connection with the above operation, it should be understood that this number could be reduced to one or increased to achieve a correspondingly different number of side and center cutting positions. Thus the centering actuators 120, 130 and 140 could be replaced by a single actuator without departing from the scope of the invention although the flexibility of the system would be reduced somewhat. In addition, other types of actuators than the pneumatic cylinders could be utilized without departing from the scope of the invention so long as the functional requirements of expanding and contracting the length of the associated linkage is accomplished. Also, the specific strokes of the actuators 120–190 can be varied widely to achieve other combinations of side and center cutting positions, and it is possible to vary the bore of these actuators to vary the pressure exerted thereby.

The invention has thus provided a fully automatic resaw setworks capable of being positioned in any one of a plurality of side or center cutting positions. By using a combination of mechanical linkages and actuators, as well as pneumatic and electrical control the setworks is operated quickly and without any manual operation other than the operation of push button switches. The mechanical portion of the operating mechanism is held to an absolute minimum thus reducing the cost and weight thereof, while increasing the accuracy and dependability of the system.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Indexing apparatus for a feedworks comprising, a frame, a set roll assembly and a press roll assembly mounted on said frame for movement toward and away from a center line therebetween, an actuator lever mounted on a said frame for movement about a pivot, first actuator means interconnecting said lever and said frame, second actuator means interconnecting said lever and said set roll assembly, third actuator means interconnecting said lever and said press roll assembly, said second and third actuator means being connected to said lever, and automatic control means movable to a side cutting position wherein said first and second actuator means are held in a preset position so that said set roll assembly is positioned against movement a preselected distance from said center line and said press roll assembly is urged toward said center line or alternately to a center cutting position wherein said second and third actuator means are locked so that movement of said lever effects movement of said set and press roll assemblies in opposite directions and said first actuator means urges said lever to move each of said assemblies toward said center line.

2. A resaw setworks comprising, a frame, a set roll assembly and a press roll assembly mounted on said frame for movement toward and away from a center line therebetween, an actuator lever mounted on said frame for movement about a pivot, a first expandable linkage interconnecting said lever and said frame, a second expandable linkage interconnecting said lever and said set roll assembly, a third expandable linkage interconnecting said lever and said press roll assembly, said second and third linkages being connected to said lever on opposite sides of and at equal distance from said pivot, and automatic control means for controlling the length of said linkages and being movable to a side cutting position wherein said first and second linkages are held at a preset length so that said set roll assembly is positioned against movement a preselected distance from said center line and said press roll assembly is urged toward said center line or to a center cutting position wherein said second and third linkages are locked at a preset length so that movement of first linkage effects movement of said lever and equal movement of said set and press roll assemblies in opposite directions.

3. A resaw setworks for feeding wood to a saw comprising, a frame, a table on said frame having a center line aligned with the saw, set roll means mounted on said frame above said table for movement toward and away from said center line, press roll means mounted on said frame above said table on the side of said center line opposite said set roll means for movement toward and away from said center line, an actuator lever mounted on said frame for movement about a pivot, a first actuator means interconnecting said lever and said frame, a second actuator means interconnecting said lever and said set rolls, a third actuator means interconnecting said lever and said press roll, said second and third actuator means being connected to said lever on opposite sides of and at equal distance from said pivot, and automatic control means for alternately adapting said set and press means for side cutting wherein said first and second actuator means are held in a preset position so that said set roll is positioned againt movement a preselected distance from said center line and said press roll is urged toward said center line with a force less than said first and second actuator means or for center cutting wherein said second and third actuator means are substantially locked so that movement of said lever effects equal movement of said set and press roll means in opposite directions and said first actuator means urges each of said rolls toward said center line.

4. A resaw setworks for feeding a wooden member to a saw comprising, a frame, a set roll assembly and a press roll assembly mounted on said frame for movement toward and away from a center line therebetween, an actuator lever mounted on said frame for movement about a pivot, a first fluid actuator means interconnecting said lever and said frame, a second fluid actuator means interconnecting said lever and said set roll assembly, a third fluid actuator means interconnecting said lever and said press roll assembly, said second and third fluid actuator means being connected to said lever on opposite sides of and at equal distance from said pivot, and automatic control means movable to a side cutting position wherein a high pressure is connected to said first and second actuator means so that said set roll assembly is positioned against movement a preselected distance from said center line and a low pressure is connected to said third actuator means so that said press roll assembly is urged toward said center line but will move in an opposite direction in response to a wooden member of varying thickness without effecting movement of said set assembly, said control means also movable to a center cutting position wherein high pressure is connected to said second and third actuator means so that movement of said lever effects equal movment of said set and press roll assemblies in opposite directions and said low pressure is connected to said first actuator means for urging said lever to move each of said assemblies toward said center line.

5. A resaw setworks for feeding wood to a saw comprising, a frame, a table on said frame having a center line aligned with the saw, set roll means mounted on said frame above said table for movement toward and away from said center line, press roll means mounted on said frame above said table on the side of said center line opposite said set roll means for movement toward and away from said center line, an actuator lever mounted on said frame for movement about a pivot, first actuator means interconnecting said lever and said frame, a second actuator means interconnecting said lever and said set rolls, a third actuator means interconnecting said lever and said press roll, said second and third actuator means being connected to said lever on opposite sides of and at equal distances from said pivot, and automatic control means for positioning said actuator means to a side cutting position wherein said first and second actuator means are held in a preset position so that said set roll means is held against movement a preselected distance from said center line and said press roll means is urged toward said center line or to a center cutting position wherein said first actuator means rotates said lever to effect equal movement of said set and press roll means in opposite directions and to urge each of said set and press roll means toward said center line.

6. A resaw setworks as defined in claim 5 wherein each of said actuator means includes one or more fluid actuators, and said automatic control means includes a valve for each of said fluid actuators and an electrical means for programming each of said actuators.

7. A resaw setworks as defined in claim 6 wherein during a side cutting operation said automatic control means supplies high pressure air to said actuators of said first and second actuator means and low pressure air to said actuators of said third actuator means so that said set roll means is substantially locked in place and said press roll means accommodates the thickness of the wood and urges the same against said set roll means.

8. A resaw setworks as defined in claim 6 wherein during a center cutting operation said automatic control means supplies high pressure air to said actuators of said second and third actuator means and low pressure air to said actuators of said first actuator means so that said second and third actuator means act as rigid links and said first actuator means urges said set and press roll means together to position the wood in alignment with the saw.

9. A resaw setworks as defined in claim 5 wherein said automatic control means includes means for moving either of said press or set roll means to a wide open position spaced a substantial distance for insertion of the wood.

10. A resaw setworks for side or center sawing a cant comprising, a frame, a set roll assembly and a press roll assembly mounted on said frame for movement toward and away from a center line therebetween, an actuator lever mounted on said frame for movement about a pivot, an expandable set linkage interconnecting said lever and said set roll assembly, an expandable press linkage interconnecting said lever and said press roll assembly, said set and press linkages being connected to said lever on opposite sides of and at equal distance from said pivot, automatic control means for controlling the length of said linkages to program the same for a side cutting wherein said set linkage is held at a preset length so that said set roll assembly is positioned against movement a preselected distance from the center line and said press roll assembly is urged toward said center line to hold the cant against the set roll assembly or to program said linkages for center cutting wherein said set and press linkages are locked at a preset length so that movement of first linkage effects movement of said lever and equal movement of said set and press roll assemblies in opposite directions, and means operable during center cutting to urge said set and press roll assemblies toward said center line with equal amounts of force and during side cutting to hold said lever against movement.

11. A resaw setworks for side or center sawing a cant or the like including slidably mounted set and press roll assemblies adapted for movement on the setworks frame toward and away from a center line therebetween, comprising first fluid actuator means connected to said set roll assembly and operable for moving said set roll assembly relative to said press roll assembly and said frame, second fluid actuator means connected to said press roll assembly and operable for moving said press roll assembly relative to said set roll assembly and said frame, and means including third fluid actuator means connected to said set and press roll assemblies through said first and second actuator means and operable to produce simultaneous movement of said set and press roll assemblies without releasing or changing said first and second actuator means for providing a side cutting operation wherein said set roll assembly is positioned against movement a preselected distance from said center line and said press roll assembly is urged toward said center line or for a center cutting operation wherein said set and press assemblies are urged toward said center line and move equal distances in opposite directions to accommodate cants of varying thickness.

12. A resaw setworks for side or center sawing a cant or the like including slidably mounted set and press roll assemblies adapted for movement on the setworks frame toward and away from a center line therebetween, comprising first fluid actuator means connected to said set roll assembly and operable for moving said set roll assembly relative to said press roll assembly and said frame, second fluid actuator means connected to said press roll assembly and operable for moving said press roll assembly relative to said set roll assembly and said frame, and means including third fluid actuator means connected to said set and press roll assemblies through said first and second actuator means and operable to produce simultaneous movement of said set and press roll assemblies without releasing or changing said first and second actuator means, and said third fluid actuator means including means defining a plurality of pressure chambers adapted to receive high and low pressure fluid for providing a side cutting operation wherein said set roll assembly is positioned against movement a preselected distance from said center line and said press roll assembly is urged toward said center line or for a center cutting operation wherein said set and press assemblies are urged toward said center line and move equal distances in opposite directions to accommodate cants of varying thickness.

13. A resaw setworks for feeding a wooden member to a saw comprising, a frame, a set roll assembly and a press roll assembly mounted on said frame for movement toward and away from a center line therebetween, an actuator lever mounted on said frame for movement about a pivot, a plurality of centering fluid actuators interconnecting said lever and said frame, set fluid actuator means interconnecting said lever and said set roll assembly, press fluid actuator means interconnecting said lever and said press roll assembly, said set and press actuator means being connected to said lever on opposite sides of at equal distance from said pivot, and automatic control means associated with said actuators and actuator means for controlling the same for center cutting wherein a high pressure is connected to said set and press actuator means so that movement of said lever effects equal movement of said set and press roll assemblies in opposite directions and low pressure is connected to each of said centering actuators for urging said lever to move each of said assemblies toward said center line, said centering actuators and control means adapted to cooperate to position said lever in a plurality of positions to vary the spacing between said assemblies.

14. A resaw setworks for feeding a wooden member to a saw comprising, a frame, a set roll assembly and a press roll assembly mounted on said frame for movement toward and away from a center line therebetween, an actuator lever mounted on said frame for movement about a pivot, a plurality of centering fluid actuators interconnecting said lever and said frame, a set fluid actuator interconnecting said lever and said set roll assembly, a press fluid actuator interconnecting said lever and said press roll assembly, said set and press actuators being connected to said lever on opposite sides of and at equal distance from said pivot, each of said actuators having a control valve associated therewith for connecting either of the chambers of each of said actuators to a high or low air pressure or to the atmosphere, and automatic electrical controls associated with said valves for positioning the same for center cutting wherein said high pressure air is connected to said set and press actuators so that movement of said lever effects equal movement of said set and press roll assemblies in opposite directions and said low pressure air is connected to each of said centering actuators for urging said lever to move each of said assemblies toward said center line, said centering actuators adapted to position said lever in a plurality of positions to vary the spacing between said assemblies.

15. A resaw setworks for feeding a wooden member to a saw comprising, a frame, a set roll assembly and a press roll assembly mounted on said frame for movement toward and away from a center line therebetween, an actuator lever mounted on said frame for movement about a pivot, centering fluid actuator means interconnecting said lever and said frame, a plurality of set fluid actuators interconnecting said lever and said set roll assembly, a press fluid actuator interconnecting said lever and said press roll assembly, said set and press actuators being connected to said lever on opposite sides of and at equal distance from said pivot, and automatic control means movable to a side cutting position wherein a high pressure air is connected to said centering actuator means so that said lever is held against rotation, said control means associated with said actuators and said actuator means to supply high pressure air to said set actuators to change the distance between said lever and said set assembly to position said set assembly in any one of a plurality of preset positions with respect to said center line, said control means adapted to supply low pressure air to said press actuator so that said press roll assembly is urged toward said center line in an opposite direction in response to a wooden member of varying thickness without effecting movement of said set assembly.

16. A resaw setworks for feeding a wooden member to a saw comprising, a frame, a set roll assembly and a press roll assembly mounted on said frame for movement toward and away from a center line therebetween, an actuator lever mounted on said frame for movement about a pivot, means for holding said lever against rotation for side cutting, a plurality of set fluid actuators interconnecting said lever and said set roll assembly, a press fluid actuator interconnecting said lever and said press roll assembly, and automatic control means movable to a side cutting position wherein a high pressure air is connected to said centering actuator means so that said lever is held against rotation, said control means associated with said actuators for holding said lever against movement and for supplying high pressure air to said set actuators to change the distance between said lever and said set assembly to position said set assembly in any one of a plurality of preset positions with respect to said center line, said control means adapted to supply low pressure air to said press actuator so that said press roll assembly is urged toward said center line but will move in an opposite direction in response to a wooden member of varying thickness without effecting movement of said set assembly.

References Cited by the Examiner
UNITED STATES PATENTS

| | | | |
|---|---|---|---|
| 1,010,701 | 12/1911 | Stevens | 143—5 |
| 1,058,897 | 4/1913 | Pelton | 143—5 |
| 2,761,473 | 9/1956 | Denton | 143—4 |

DONALD R. SCHRAN, *Primary Examiner.*